May 15, 1951  A. ROANO  2,553,384
HELICAL GEARING
Original Filed July 14, 1947  3 Sheets-Sheet 1
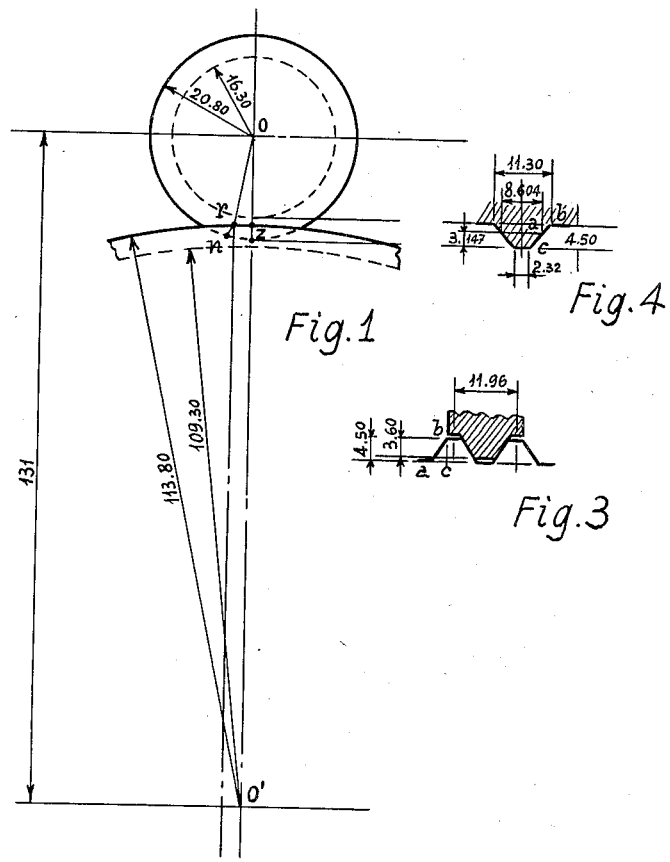
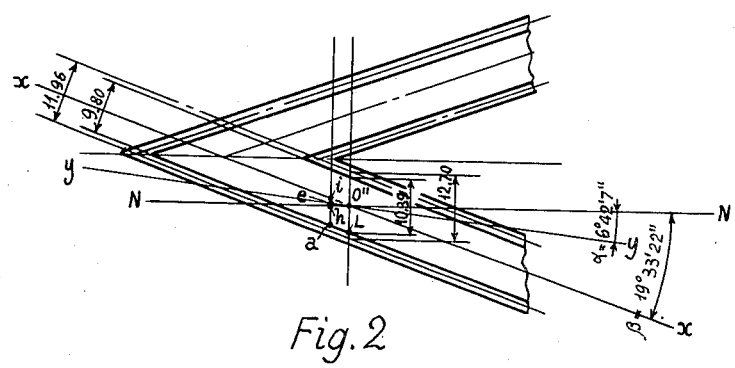
Fig. 2
Inventor
Alessandro Roano
By Howard P. King
Attorney May 15, 1951      A. ROANO      2,553,384
HELICAL GEARING
Original Filed July 14, 1947      3 Sheets-Sheet 2
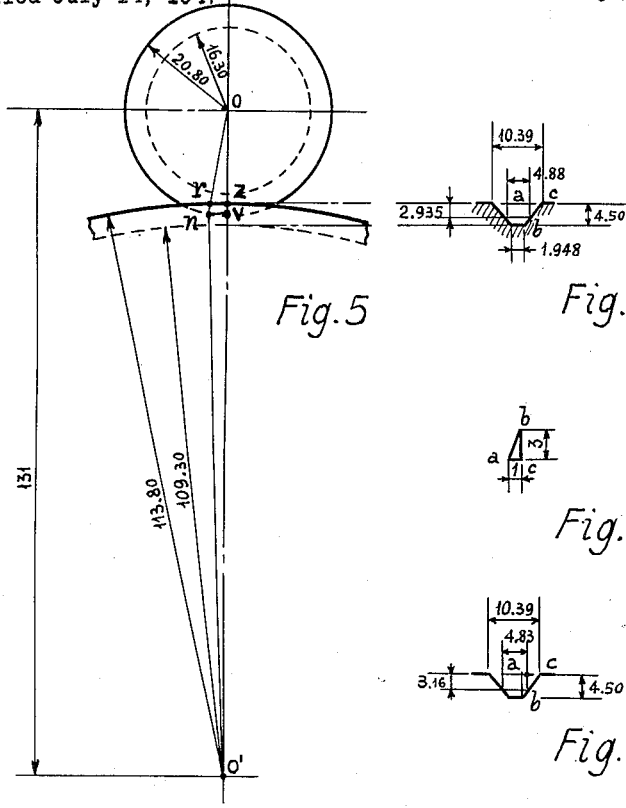
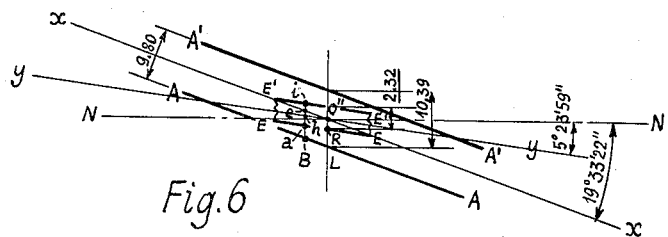
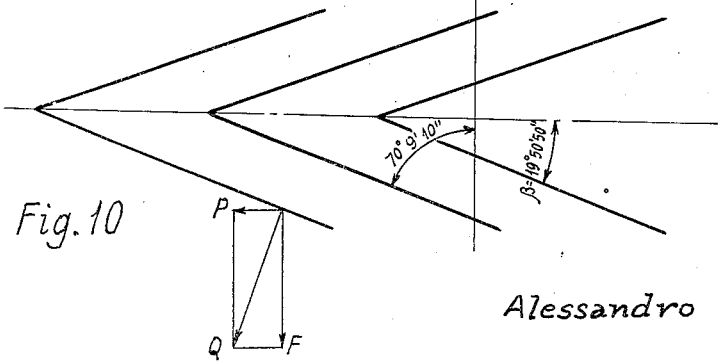
Inventor
Alessandro Roano
By Howard P. King
Attorney May 15, 1951  A. ROANO  2,553,384
HELICAL GEARING Original Filed July 14, 1947  3 Sheets-Sheet 3

Inventor
Alessandro Roano
By Howard P. King
Attorney

Patented May 15, 1951

2,553,384

UNITED STATES PATENT OFFICE 2,553,384

HELICAL GEARING

Alessandro Roano, Genoa, Italy

Original application July 14, 1947, Serial No. 760,842. Divided and this application July 8, 1949, Serial No. 103,702. In Italy July 8, 1946

8 Claims. (Cl. 74—466)

The present invention relates to gear trains, and more particularly single or double helical non-reciprocal gear wheels meshing between parallel axes, and is a division of prior application S. N. 760,842, filed July 14, 1947.

An object of the present invention is an improvement to gears which have already been studied and patented by the same applicant. In these previous patents, special helicoidally toothed gears, between parallel axes, have been considered, which, among others, present the following characteristics:

(1) The pitch diameters of the wheels are substantially smaller than what they ought to be in relation to the reduction ratio if they were calculated according to the module system, but the axial pitches of the teeth of both wheels are the same, and, therefore the angles of inclination of the helicoidal threads from which the teeth are formed, are different.

(2) The profile of the cross-sections of the teeth must be of the trapezoid shape;

(3) The wheels have generally been considered of the double helical system, but they might be of the single one.

(4) The contact, between the engaged teeth of the pinion and wheel, takes place along a line which is displaced in the known manner (by said previous patents) from the plane passing through the axes of the pinion and of the wheel and is inclined in the known manner (also by said previous patents) in relation to said plane, the transverse cross section of the tooth outline of the pinion being a trapezoid shape, as said before.

Through tests and studies it has been ascertained that by using determined forms, reversibility or irreversibility of such gears may be obtained; viz. it is possible to fix the limit conditions, on one side of which the gear is reversible, and on the other side of which the gear is irreversible.

Indicating by $\rho$ the angle of inclination of the helicoidal thread from which are formed the pinion teeth, by $\beta$ the angle of inclination of the helicoidal thread from which the teeth of the driven wheel are formed, by $2p$ the angle between the two inclined side flanks of the trapeze constituting the trapeze shaped outline of the pinion teeth, we have that, in order to obtain the irreversibility of the gear, the following conditions must be fulfilled or be taken into account and they constitute the object of the invention:

(a) The said tooth cross-section outline must have the inclined flanks of trapezoid section with an angle $\rho$ comprised between 39° and 52° for the pinion and, accordingly, between 36° and 51° for the wheel.

(b) By the same angle of inclination $\alpha$ of the helical worm of pinion, the tooth flank angle $\rho$ of the aforesaid pinion tooth, increases substantially proportionally to the increase of the angle of inclination $\beta$ of the helical worm of the tooth of the driven wheel.

(c) By the same angle of inclination $\beta$ of the helical worm of the driven wheel tooth, the angle $\alpha$ of the aforesaid pinion tooth section, increases with the increase of the angle of inclination $\rho$ of the helical line of the pinion tooth.

(d) The angle of inclination of the flank of the aforesaid section of the space between the teeth of the driven wheel varies according to a law analogous to that aforementioned for the pinion teeth, but remaining, however, always just a little smaller than the corresponding angle of the aforesaid tooth section of the pinion.

It is obvious how much important is the fact of having determined the preceding conditions, because, by leaving unaltered the fundamental characteristics of the couple, viz: diameter of the pitch circles—inequality of the angles of inclination of the helical worms—much reduced wheel diameter compared with that it ought to have in the modular system for the transmission ratio required-height of teeth and so on, it is possible by a simple change in the items, as given under the precedent letters $(a)$, $(b)$, $(c)$, $(d)$, to obtain at will, the reversibility or the irreversibility of the gear.

In the annexed sheet of drawings is illustrated, first of all, what is already known through the previous patents of the same applicant and will be used as a basis for the explanation of the novelty which is the object of the present invention, and, afterwards, what is referring especially to the present invention; all this by way of example.

Fig. 1 represents a schematical side view, in the direction of the axes, of a pinion and of a portion of the driven wheel.

Fig. 2 shows, on a larger scale, a schematical plan of the side lines of the thickness at the exterior end of two consecutive teeth of the driven wheel.

Fig. 3 represents a section, normal to the inclination axis of the helical worms of the wheel, of two consecutive teeth of same, and of a tooth of the pinion;

Fig. 4 represents the section of a pinion tooth, made according to a plane parallel to plane of Fig. 1.

Fig. 5 is a figure analogous to Fig. 1, predisposed for reference to the successive figure.

Fig. 6 is a schematical partial plan view of the side lines of the thickness of the teeth of pinion and wheel.

Fig. 7 represents the section of a space between two teeth of the wheel, made by a plane parallel to that of Fig. 5.

Fig. 8 is a graphic representation in relation to the line of contact between the teeth.

Fig. 9 shows analogously to Fig. 7 the section of a space between two teeth of the wheel.

Fig. 10 is a schematical and partial plan of the teeth of the wheel, the teeth being incline, according to the helical worms in relation to the pitch circle.

Figure 12:
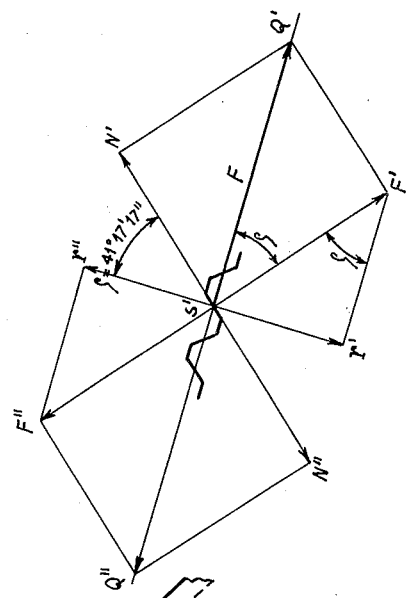
Fig. 12 is a partial section of the gear, as seen normally to a generating line and cut by a plane passing on the line of contact between the pinion and wheel teeth.

With particular reference to what has been illustrated in said figures, we have that line $x—x$ (Fig. 2) represents the inclination axis of the helical worm of the wheel teeth referred to the external circumference of the wheel, in relation to the normal plane to the axis; line $y—y$ indicates the inclination axis of the helical worm of the pinion, referred to the internal diameter increased by the teeth bottom play (or backlash); line N—N, perpendicular to the plane of the axes, is a line serving for geometrical constructions; the distance between the middle lines of the two consecutive teeth measured along the line $O'—O''$ corresponds to the axial pitch.

With reference to Fig. 3, we have that the distance between the middle-lines of the teeth represents the normal pitch of the wheel.

With reference to Fig. 6, we have that the distance between the parallels E—E, E'—E' represents, on a double scale, the thickness of the exterior portion of a pinion tooth; the distance between the parallels A—A, A'—A' represents the width of the space of tooth of the wheel in correspondence to the external circumference; line $y'—y'$ indicates the axis of inclination of the helical worm of pinion referred to the external circumference of same.

Fig. 8 represents the triangle $abc$ in which the hypotenuse $ab$ corresponds to the line of contact $nr$ of Fig. 5, and the cathetus $bc$ and $ca$ are respectively obtained by a parallel joining centers O, O' and a perpendicular line to it.

In Fig. 10 the teeth are inclined according to an inclination of the helical worm on the pitch circle.

A couple of irreversible toothed wheels, already practically built, answering satisfactorily to all requirements has the following dimensions:

Pinion.—Inner diameter 32.60, pitch diameter 38, outer diameter 41.60, a single double-helical tooth, axial pitch 12.70.

Wheel.—Inner diameter 218.60, pitch diameter 224, outer diameter 227.60:20, double-helical teeth, axial pitch of the helices 12.70×20=254. Velocity ratio 1:20, viz. just the ratio between the number of teeth. Distance between the centres 131.

From the above data it is seen (see Figure 1) that the height of the teeth which take part to the driving is 3.60 and that there is a play at the bottom of the spaces of 0.90.

Therefore, the inclination of the helices of the pinion related to the inner diameter increased by the said play and with regards to a plane at right angles to the axis is given by:

$$\text{Ang. tan } \frac{12.70}{3.14(32.60+2\times 0.90)}=$$

$$\text{Ang. tan } 0.11751 = 6°\ 42'\ 7''$$

while the inclination of the helices of the wheel, with respect to the outer circumference and also related to the plane at right angles to the axis is $$\text{Ang. tan } \frac{254}{227.60\times 3.1416}=$$

$$\text{Ang. tan } 0.35523 = 19°\ 33'\ 22''$$

As the axial pitch of the gears is 12.70, the normal pitch of the wheel is equal to 12.70 cos 19° 33′ 22″=11.96.

By means of the above data, Figure 2 might be drawn, which represents a partial plan view of two consecutive teeth of the wheel, in which the lines $yy$ and $xx$ are the axes of the helices of the pinion and of the wheel, respectively, while the distance between the midlines of the two teeth corresponds to the above determined normal pitch, viz. to 11.96.

Let us now determine the thickness of the teeth fronts:

Having drawn two consecutive teeth of the wheel, Figures 3, seen in elevation and at right angles to the helices, in which we know that the normal pitch equals 11.96, in order to satisfy to the condition that the shape of the cross section of the sheet must be very trapezoidal, must be the angle $abc=45°$. Then the thickness of the fronts of the wheel teeth and that of the fronts of the pinion teeth which, as known, penetrate into the spaces between the teeth up to the depth of 3.60 are:

$$\frac{11.96-(3.60\times \tan 45°\times 2)}{2}=\frac{11.96-7.20}{2}=2.38$$

As however the thickness of the teeth fronts must be obviously greater than that of the wheel teeth, let us reduce this latter to 2.16 mm. Therefore the width of the wheel spaces at the outer circumference, seen perpendicularly to the helices, is:

$$11.96-2.16=9.80$$

while the width of the same spaces, likewise at the outer circumference, but seen at right angles to a generator, is:

$$\frac{9.80}{\cos 19°\ 33'\ 22''}=10.39$$

Hence $$o''L=\frac{10.39}{2}=5.19 \text{ (see Figure 2)}$$

[It is to be noted that from the graph it results that the contact line $nr$, Figure 1 is long about 3 mm. so that at the point $r$, Figure 1, the thickness of the pinion teeth is given by (see Figure 3):

[3×tan 45°×2=6, to which the thickness of the front of the pinion teeth must be added, corresponding to 2.38+(2.38−2.16)=2.60.

[Consequently at the point $r$ the thickness of the pinion teeth is 6+2.60=8.60.

[Draw in Figure 2, a parallel to line $yy$ at a distance from this latter of $$\frac{8.60}{2}$$

this line intersects the edge of the gear teeth at point $a$ which, graphically, results at a distance of little less than 4 mm. from the plane of the axes. From said point $a$ draw a parallel to line $0''$, $o'$, so as to determine the points $a$, $h$, $e$, $i$, Figure 2 and the point $r$ in Figure 1.]

We fix the particulars of heights and corresponding thicknesses of the pinion teeth which will be used later on to prove that the contact takes place only at point $r$ situated on the outer circumference of the wheel and at a distance of a quantity $=3.70$ from the plane of axes $OO'$.

All data reported between the above square parentheses are approximate. The same have been useful only for determining that point $r$, Figure 1, comes to be approximately at a distance of about 4 mm. from the plane of the axes, as aforesaid, but this distance must be determined with mathematical precision, together with the remaining quotas. For this reason let us determine first the heights and the corresponding thicknesses that the teeth should possess in order to obtain the contact also at the right and left of the point $r$, at the arbitrary distances given below, then by suitably shaping their profile, we shall reduce the contact to a single point.

This may be done as follows:

Before all, it is to be pointed out that my research consists in finding mathematically the length of the line $ae$, Figure 2 which, as it is apparent, when doubled, gives us the thickness which the pinion teeth possess in order to obtain the contact at that point $r$, which results from the projection of the point $a$ in Figure 1.

Then let us drop a perpendicular from point $r$, which is being considered, on to line $oo'$ and I obtain the chord half $rz$. Furthermore, imagine that an arbitrary number of other chord halves originating at $r$, be dropped always on to the outer circumference of the wheel and be drawn at the following distances from the plane of the axes: 4.60, 4.30, 4, 3.70, 3.40, 3.10 and 2.80.

At the point $r$, which lies at a distance of 4.60 from the plane of the axes, is:

$$o'z = \sqrt{113.80^2 - 4.60^2} = 113.706$$

$$oz = 131 - 113.706 = 17.294$$

$$or = \sqrt{17.294^2 + 4.60^2} = 17.895$$

By subtracting from the outer radius of the pinion the above determined value of $or$, the height of the pinion tooth at the point $r$ is obtained, viz:

$$20.80 - 17.895 = 2.905$$

It is apparent that, in order to obtain a contact, half the thickness belonging to said point $r$ corresponds to the length of line $ae$, Figure 2, which is determined as follows:

The helix of a pinion tooth originating in the plane of the axes and with radius $o'r$, on the path of the arc subtended to angle $ro'z$ advances axially by the distance $hi$.

Now the length of $he$ and $hi$ are determined as follows:

$$\text{Ang. sin } roz = \text{ang. sin } \frac{4.60}{17.895} =$$

$$\text{ang. sin } 0.25705 = 14° 53' 42''$$

If the helix of a pinion tooth advances axially in a whole turn by 12.70, it advances through $14° 53' 42''$ by:

$$\frac{12.70 \times 14° 53' 42''}{360°} = 0.525 = \text{stroke } he$$

Then $$\text{Ang. sin } so'r = \text{ang. sin } \frac{4.60}{113.80} =$$

$$\text{ang. sin } 0.04042 = 2° 19'$$

If the fictitious helix of a wheel space advances axially during a whole turn by 254, it advances through $2° 19'$ by:

$$\frac{254 \times 2° 19'}{360°} = 1.634 = \text{stroke } hi$$

But, (see Figure 2)

$$ai = o'' \quad L = 5.19$$

Hence:

$$ah = ai - hi = 5.19 - 1.634 = 3.556$$

and $$ae = ah + he = 3.556 + 0.525 = 4.081$$

$4.081 \times 2 = 8.162 =$ thickness, seen perpendicularly to a generatrix, that the teeth have at the height 2.905 in order to obtain the contact of the point $r$ lying at a distance of 4.60 from the plane of the axes.

We fix after that, other items which will be used later on in order to render evident that the contact takes place only at point $r$ situated on the outer circumference of the wheel at a distance 3.70 from the plane of the axes.

The above proceeding will be truly followed for the determination of the heights and of the corresponding thicknesses that the pinion teeth ought to have in order to obtain the contact in the other points $r$ that lie, as said, at distance of 4.30, 4, 3.70, 3.40, 3.10 and 2.80 from the plane of the axes.

In the course of the development, we will however omit the specification, as this would lead to repetition of ideas already set out, and will execute the calculations only.

Therefore:

At the point $r$, lying at a distance 4.30 from the plane of the axes, is:

$$o'z\sqrt{113.80^2 - 4.30^2} = 113.718$$

$$oz = 131 - 113.718 = 17.282$$

$$or = \sqrt{17.282^2 + 4.30^2} = 17.808$$

$$20.80 - 17.808 = 2.992 = \text{height of the teeth}$$

Furthermore:

$$\text{Ang. sin } roz = \text{ang. sin} \frac{4.30}{17.808} =$$

$$\text{ang. sin } 0.24146 = 13° 58' 21'$$

hence $$\frac{12.70 \times 13° 58' 21''}{360°} = 0.492 = \text{stroke } he$$

Then:

$$\text{Ang. sin } ro'z = \text{ang. sin} \frac{4.30}{113.80} =$$

$$\text{ang. sin } 0.03778 = 2° 9' 53''$$

it follows:

$$\frac{254 \times 2° 9' 53''}{360°} = 1.527 = \text{stroke } hi$$

But $$ai = o'' \quad L = 5.19$$

hence $$ah = ai - hi = 5.19 - 1.527 = 3.663$$

and $$ae = ah + he = 3.663 + 0.492 = 4.155$$

$4.155 \times 2 = 8.310 =$ thickness, seen at right angles to a generatrix, that the pinion teeth ought to have at the height 2.992 in order to obtain the contact at the point $r$ lying at a distance of 4.30 from the plane of the axes.

At the point $r$, lying at a distance of 4 mm. from the plane of the axes, is:

$$o'z = \sqrt{113.80^2 - 4^2} = 113.729$$
$$oz = 131 - 113.79 = 17.271$$
$$or = \sqrt{17.271^2 + 4^2} = 17.728$$
$$20.80 - 17.728 = 3.072 = \text{height of the teeth}$$

Furthermore:

Ang. sin $roz =$ ang. sin $\dfrac{4}{17.728} =$ ang. sin $0.22563 = 13°\ 2'\ 24''$ hence $$\dfrac{12.70 \times 13°\ 2'\ 24''}{360°} = 0.460 = \text{stroke } he$$

Then

Ang. sin $ro'z =$ ang. sin $\dfrac{4}{113.80} =$ ang. sin $0.03514 = 2°\ 49'$ it follows:

$$\dfrac{254 \times 2°\ 49'}{360°} = 1.420 = \text{stroke } hi$$

But $$ai = o''\ L = 5.19$$

hence $$ah = ai - hi = 5.19 - 1.420 = 3.770$$

and $$ae = ah + he = 3.770 + 0.460 = 4.230$$

$4.230 \times 2 = 8.460 =$ thickness, seen at right angles to a generatrix, that the pinion teeth ought to have at the height 3.072 in order to obtain the contact at the point $r$ lying at a distance of 4 mm. from the plane of the axes.

At the point $r$, lying at a distance of 3.70 from the plane of the axes, is:

$$o'z = \sqrt{113.80^2 - 3.70^2} = 113.739$$
$$oz = 131 - 113.739 = 17.261$$
$$or = \sqrt{17.261^2 + 3.70^2} = 17.653$$
$$20.80 - 17.653 = 3.147 = \text{height of the teeth}$$

Furthermore:

Ang. sin $roz =$ ang. sin $\dfrac{3.70}{17.653} =$ ang. sin $0.20959 = 12°\ 5'\ 53''$ hence $$\dfrac{12.70 \times 12°\ 5'\ 53''}{360°} = 0.426 = \text{stroke } he$$

Then:

Ang. sin $ro'z =$ ang. sin $\dfrac{3.70}{113.80} =$ ang. sin $0.03251 = 1°\ 51'\ 46''$ it follows:

$$\dfrac{254 \times 1°\ 51'\ 46''}{360°} = 1.314 = \text{stroke } hi$$

But $$ai = o''\ L = 5.19$$

hence:

$$ah = ai - hi = 5.19 - 1.314 = 3.876$$

and $$ae = ah + he = 3.876 + 0.426 = 4.302$$

$4.302 \times 2 = 8.604 =$ thickness, seen at right angles to a generatrix, that the pinion teeth ought to have at the height 3.147 in order to obtain the contact of point $r$ lying at a distance of 3.70 from the plane of the axes.

At the point $r$, lying at a distance of 3.40 from the plane of the axes, is:

$$o'z = \sqrt{113.80^2 - 3.40^2} = 113.749$$
$$oz = 131 - 113.749 = 17.251$$
$$or = \sqrt{17.251^2 + 3.40^2} = 17.582$$
$$20.80 - 17.582 = 3.218 = \text{height of the teeth}$$

Furthermore:

Ang. sin $ros =$ ang. sin $\dfrac{3.40}{17.582} =$ ang. sin $0.19337 = 11°\ 8'\ 58''$ hence:

$$\dfrac{12.70 \times 11°\ 8'\ 58''}{360°} = 0.393 = \text{stroke } he$$

Then:

Ang. sin $ro'z =$ ang. sin $\dfrac{3.40}{113.80} =$ ang. sin $0.02987 = 1°\ 42'\ 42''$ it follows:

$$\dfrac{254 \times 1°\ 42'\ 42''}{360°} = 1.207 = \text{stroke } hi$$

But $$ai = o''\ L = 5.19$$

hence:

$$ah = ai - hi = 5.19 - 1.207 = 3.983$$

and $$ae = ah + he = 3.983 + 0.393 = 4.376$$

$4.376 \times 2 = 8.752 =$ thickness, seen at right angles to a generatrix, that the pinion teeth ought to have at the height 3.218 in order to obtain the contact of point $r$ lying at a distance of 3.40 from the plane of the axes.

At the point $r$, lying at a distance 3.10 from the plane of the axes, is:

$$o'z = \sqrt{113.80^2 - 3.10^2} = 113.757$$
$$oz = 131 - 113.757 = 17.243$$
$$or = \sqrt{17.243^2 + 3.10^2} = 17.519$$
$$20.80 - 17.519 = 3.281 = \text{height of the teeth}$$

Furthermore:

Ang. sin $roz =$ ang. sin $\dfrac{3.10}{17.519} =$ ang. sin $0.17695 = 10°\ 11'\ 31''$ hence $$\dfrac{12.70 \times 10°\ 11'\ 31''}{360°} = 0.359 = \text{stroke } he$$

Then

Ang. sin $ro'z =$ ang. sin $\dfrac{3.10}{113.80} =$ ang. sin $0.02724 = 1°\ 33'\ 39''$ it follows:

$$\dfrac{254 \times 1°\ 33'\ 39''}{360°} = 1.101 = \text{stroke } hi$$

But $$ai = o''\ L = 5.19$$

hence $$ah = ai - hi = 5.19 - 1.101 = 4.089$$

and $$ae = ah + he = 4.089 + 0.359 = 4.448$$

$4.448 \times 2 = 8.896 =$ thickness, seen at right angles to a generatrix, that the pinion teeth ought to have at the height 3.281 in order to obtain the contact at the point $r$ lying at a distance of 3.10 from the plane of the axes.

At the point $r$, lying at a distance of 2.80 from the plane of the axes, is:

$$o'z = \sqrt{113.80^2 - 2.80^2} = 113.765$$

$$oz = 131 - 113.765 = 17.235$$

$$or = \sqrt{17.235^2 + 2.80^2} = 17.460$$

$20.80 - 17.460 = 3.340 =$ height of the teeth

Furthermore:

Ang. sin $roz =$ ang. sin $\dfrac{2.80}{17.460} =$ ang. sin $0.16036 = 9°\ 13'\ 39''$ hence:

$$\frac{12.70 \times 9°\ 13'\ 39''}{360°} = 0.325 = \text{stroke } he$$

Then:

Ang. sin $ro'z =$ ang. sin $\dfrac{2.80}{113.80} =$ ang. sin $0.02460 = 1°\ 24'\ 34''$ it follows:

$$\frac{254 \times 1°\ 24'\ 34''}{360°} = 0.994 = \text{stroke } hi$$

But $$ai = o''\ L = 5.19$$

hence $$ah = ai - hi = 5.19 - 0.994 = 4.196$$

and $$ae = ah + he = 4.196 + 0.325 = 4.521$$

$4.521 \times 2 = 9.042 =$ thickness, seen at right angles to a generatrix, that the pinion teeth ought to have at the height 3.340 in order to obtain the contact of point $r$ lying at a distance of 2.80 from the plane of the axes.

We make the analysis of the previously determined points, in order to confirm that the contact takes place only at point $r$ situated on the outer circumference of the wheel which is at the distance of 3.70 from the plane of axes $OO'$.

Now, let us draw the figure of a pinion tooth, Figure 4, always seen at right angles to a generatrix by taking into account the height and the thickness thereof at the point $r$ lying at a distance of 3.70 from the plane of the axes, in order the contact is obtained at that point. In fact in said figure, the data 3.147 and 8.604 are found, which have been found above just at the point $r$ lying at a distance of 3.70 from the plane of the axes. Furthermore, by making the thickness of the tooth front equal to 2.32, the inclination of the profile is such as to exclude the contact at the right and left of said point $r$.

Let us first point out that (Figure 4)

Ang. tan $acb =$ ang. tan $\dfrac{\frac{1}{2} 8.604 - \frac{1}{2} 2.32}{3.147} =$ ang. tan $0.99841 = 44°\ 57'15''$ From a drawing on a larger scale of the pinion tooth section made by a plane passing along a generating line of the pitch cylinder and taking into account the different distances $$4.60 - 4.30 - 4.00 - 3.70 - 4.40 - 3.10 - 2.80$$

of the horizontal sections of said cross-section of the tooth in relation to the plane $OO'$ of the axes it must be proceeded as follows; for each horizontal section, first of all, the distance $rz$ (for instance 4.60) of the considered section, is indicated; after that the thickness 2.32 of the upper face of tooth and, after that, the product of the length of the tooth (2.905) in correspondence to this distance (4.60) multiplied by aforesaid tangent (0.99841) and for .2 in order to take into account that the increase in thickness takes place on both sides of the tooth, is added to it and the width 8.120 of the horizontal section of said cross-section of the tooth is obtained. As this width is smaller than the thickness, as seen in a normal direction to a generating line, the pinion tooth must have at said length (2.905) in order to have the contact in correspondence to the considered section (4.60), it may be inferred that in correspondence to this section, there is no contact. Indeed, it may be seen, that the calculated thickness 8.120 is smaller than the precedingly calculated thickness 8.162 previously determined (line 24 of column 6).

$rz = 4.60 - 2.32 + (2\ 905 \times 0.99841 \times 2) = 8.120 < 8.162$ by 0.042
$rz = 4.30 - 2.32 + (2.992 \times 0.99841 \times 2) = 8.294 < 8.310$ by 0.016
$rz = 4\ \ \ - 2.32 + (3.072 \times 0.99841 \times 2) = 8.454 < 8.460$ by 0.006
$rz = 3.70 - 2.32 + (3.147 \times 0.99841 \times 2) =$ Figure 4
$rz = 3.40 - 2.32 + (3.218 \times 0.99841 \times 2) = 8.745 < 8.752$ by 0.007
$rz = 3.10 - 2.32 + (3.281 \times 0.99841 \times 2) = 8.870 < 8.896$ by 0.026
$rz = 2.80 - 2.32 + (3.340 \times 0.99841 \times 2) = 8.988 < 9.042$ by 0.054
$\qquad 2.32 + (4.50 \times 0.99341 \times 2) = 11.30$ From aforesaid table it can be seen that there is contact only correspondingly to section $rz = 3.70$ and that for the preceding and following sections this contact fails.

By examining the above table from the bottom line upward, in the first (i. e. the last) line it is found the method which has been adapted for determining the thickness of the tooth at the maximum height.

In the second line (from below) it results that the tooth at the height 3.340 has a thickness of 8.988, while in order to obtain the contact at the point $r$ lying at a distance of 2.80 from the plane of the axes, such thickness should have been 9.042, just as it has been demonstrated above and therefore there is a difference of 0.054.

In the third line it is found that at the point $r$, lying at a distance of 3.10 from the plane of the axes, there is no contact due to a difference of 0.026.

In the fourth line, in which the point $r$ results at 3.40 from the plane of the axes, there is no contact due to a difference of 0.007.

It is apparent that in the fifth line the thickness of the tooth is equal to that indicated in Figure 4 and therefore there is a contact at the point $r$ lying at a distance of 3.70 from the plane of the axes.

Finally, at the points indicated in the sixth, seventh and eighth line there is no contact, due to difference of 0.006, 0.016 and 0.042 respectively.

Consequently I have shown the manner how the shape of the pinion teeth should be determined and have also demonstrated that by means of such teeth it is possible to obtain the contact with the front edges of the wheel only at the point $r$, lying at a distance of 3.70 from the plane of the axes.

It is apparent that the shape of the spaces can be determined easily by following the proceeding which has been adopted for the pinion of the reciprocal gear pair already mentioned.

Now let us first determine how the shape of the teeth of wheel $e$ is determined and then how the contact is obtained along the whole line $nr$, Figure 1.

Draw Figure 5, which is a reproduction of Figure 1, join the point $n$ with the gear centres and from the same point $n$ drop a perpendicular to line $oo'$, thus determining the chord half $nv$.

Figure 6 is a diagrammatically plan view of a part of Figure 5, in which there are indicated: the axis $yy$ of a pinion tooth, which is inclined following the slant of the helix resulting from the outer circumference and the thickness of the front of the same tooth bounded by the lines EE, E'E' (said front is drawn in Figure 6 on a double scale); the imaginary axis $xx$ of a wheel space, referred to the inclination of the helix at the outer circumference and the width of the same space bounded by the lines AA, A'A', as well as the projection of the point $n$ on the axis $xx$, on the axis $yy$, on the construction line NN, on the front edge of the pinion tooth indicated by line EE and on the front edge of a wheel tooth indicated by the line AA, thus determining the points $i, e, h, a, B$.

Due to the fact that the contact between the teeth must take place along the whole line $nr$, Figure 5, let us determine first the width of the wheel spaces, in order to obtain the contact only in the point $n$ and afterwards proceed to determine the other points.

It is to be noted that the point $n$, which comes to be on the front edge of the pinion teeth, in the plan view shown in Figure 6, falls on the same front edge at the point $a$. Therefore, in order that there shall be contact at that point, the wheel spaces must have a width that is equal to the distance of the points $a$ and $i$, multiplied by 2.

Let us now bear in mind the condition that the contact between the teeth must take place at the same time and continuously along the whole line $nr$ (Fig. 1) and that the same line must be inclined by approximately 18° with respect to the axis and, by satisfying said conditions it results that the point $n$ comes to be at a distance of about 5 mm. from the plane of the axes. We fix the values of the depth of the spaces of the wheel and the corresponding widths, seen normally to a generating line, which will be used later on to prove that the contact takes place, only at point $n$ situated on the external circumference of the pinion at a distance 4.80 from the plane of axes OO'. But such a distance between the point $n$ and the plane of the axis must be determined with mathematical precision, which precision is obtained by determining first the various widths which the spaces ought to have in order to obtain the contact even at the right and the left of the point $n$, at the arbitrary distances mentioned below and then, by suitably shaping the spaces, the contact will be reduced to a single point $n$.

Be said distances the following ones: 5.70, 5.40, 5.10, 4.80, 4.50, 4.20, 3.90.

At the point $n$, which lies at a distance 5.70 from the plane of the axes, is (Figure 5):

$$ov=\sqrt{20.80^2-5.70^2}=20.003$$
$$o'v=131-20.003=110.997$$
$$o'n=\sqrt{110.997^2+5.70^2}=111.143$$

By substracting from the outer radius of the wheel the above determined value of $o'n$, the depth of the wheel spaces at the point $n$ lying at a distance of 5.70 from the plane of the axes, is obtained, viz:

$$113.80-111.143=2.657$$

It is to be noted that the helix which corresponds to the outer circumference of the pinion and which originates in the plane of the axes, which is indicated in Figure 6 by the point $o''$, during the angular shifting by the arc subtended to the angle $nov$ advances axially by the distance $he$.

At the same time the helix corresponding to the radius $o'n$ of the wheel, and which originates also in $o''$ in the plane of the axes $e$, Figure 6, during the angular shifting by the arc subtended to the angle $no'v$ advances axially by $hi$.

Let us now determine the lengths of said distances in the following manner:

$$\text{Ang. sin } nov = \text{ang. sin } \frac{5.70}{20.80} =$$
$$\text{ang. sin } 0.27403 = 15°54'15''$$

If the helix of a pinion tooth advances axially during a whole turn by 12.70 it advances through 15° 54' 15'' by $$\frac{12.70\times15°54'15''}{360°}=0.561=\text{stroke } he$$

Then:

$$\text{Ang. sin } no'v = \text{ang. sin } \frac{5.70}{111.143} =$$
$$\text{ang. sin } 0.05128 = 2°56'21''$$

If the helix of a wheel tooth advances axially during a whole turn by 254, it advances through 2° 56' 21'' by $$\frac{254\times2°56'21''}{360°}=2.073=\text{distance } hi$$

But $$ei=hi\ he=2.073-0.561=1.512$$
$$ae=o''R=\frac{2.32}{2}=1.16$$

hence $$ai=ae\ ei=1.16+1.512=2.672$$

$2.672\times2=5.344=$width, seen at right angles to a generatrix, that wheel spaces ought to have at the depth 2.657 in order to obtain the contact at the point $n$ lying at a distance of 5.70 from the plane of the axes.

We fix, by a similar procedure, other items which will be used, later on, to render evident that the contact takes place only at point $n$ situated on the external circumference of the pinion at a distance 4.80 from the plane passing through OO'.

At the point $n$, lying at a distance of 5.40 from the plane of the axes, is:

$$ov=\sqrt{20.80^2-5.40^2}=20.086$$
$$o'v=131-20.086=110.914$$
$$o'n=\sqrt{110.914^2+5.40^2}=111.045$$

$113.80-111.045=2.755=$depth of the spaces

Furthermore:

$$\text{Ang. sin } nov = \text{ang. sin } \frac{5.40}{20.80} =$$
$$\text{ang. sin } 0.25961 = 15°2'48''$$

hence $$\frac{12.70\times15°2'48''}{360°}=0.53=\text{distance } he$$

Then:

$$\text{Ang. sin } no'v = \text{ang. sin } \frac{5.40}{111.045} =$$
$$\text{ang. sin } 0.04862 = 2°47'12''$$

It follows:

$$\frac{254\times2°47'12''}{360°}=1.966=\text{stroke } hi$$

But $$ei=hi-he=1.966-0.53=1.436$$
$$ae=1.16$$

hence $$ai=ae+ei=1.16+1.436=2.596$$

$2.596 \times 2 = 5.192$ = width, see, at right angles to a generatrix, that the wheel spaces ought to have at the depth 2.755, in order to obtain the contact at the point $n$ lying at a distance of 5.40 from the plane of the axes.

At the point $n$, lying at a distance of 5.10 from the plane of the axes is:

$$ov = \sqrt{20.80^2 - 5.10^2} = 20.165$$
$$o'v = 131 - 20.165 = 110.835$$
$$o'n = \sqrt{110.835^2 + 5.10^2} = 110.952$$

$113.80 - 110.952 = 2.848$ = depth of the spaces.

Furthermore:

Ang. sin $nov$ = ang. sin $\frac{5.10}{20.80}$ = ang. sin $0.24519 = 14° 11' 35''$ hence:

$$\frac{12.70 \times 14° 11' 35''}{360°} = 0.50 = \text{stroke } he$$

Then:

Ang. sin $no'v$ = Ang. sin $\frac{5.10}{110.952}$ = ang. sin $0.04596 = 2° 38' 2''$

It follows:

$$\frac{254 \times 2° 38' 2''}{360°} = 1.858 = \text{stroke } hi$$

But $$ei = hi - he = 1.858 - 0.50 = 1.358$$
$$ae = 1.16$$

hence $$ai = ae + ei = 1.16 + 1.358 = 2.518$$

$2.518 \times 2 = 5.036$ = width, seen at right angles to a generatrix, that the wheel spaces ought to have at the depth 2.848 in order to obtain the contact at the point $n$ lying at a distance of 5.10 from the plane of the axes.

At the point $n$, lying at a distance 4.80 from the plane of the axes, is:

$$ov = \sqrt{20.80^2 - 4.80^2} = 20.238$$
$$o'v = 131 - 20.838 = 110.762$$
$$o'n = \sqrt{110.762^2 + 4.80^2} = 110.865$$

$113.80 - 110.865 = 2.935$ = depth of the spaces

Furthermore:

Ang. sin $nov$ = ang. sin $\frac{4.80}{20.80}$ = ang. sin $0.23076 = 13° 20' 29''$ hence $$\frac{12.70 \times 13° 20' 29''}{360°} = 0.47 = \text{stroke } he$$

Then:

Ang. sin $no'v$ = ang. sin $\frac{4.80}{110.865}$ = ang. sin $0.04329 = 2° 28' 51''$ hence $$\frac{254 \times 2° 28' 51''}{360°} = 1.75 = \text{stroke } hi$$

But $$ei = hi - he = 1.75 - 0.47 = 1.28$$
$$ae = 1.16$$

hence $$ai = ae + ei = 1.16 + 1.28 = 2.44$$

$2.44 \times 2 = 4.88$ = width, seen at right angles to a generatrix, that the wheel spaces ought to have at the depth 2.395 in order to obtain the contact at the point $n$ lying at a distance of 4.80 from the plane of the axes.

At the point $n$ lying at a distance of 4.50 from the plane of the axes is:

$$ov = \sqrt{20.80^2 - 4.50^2} = 20.307$$
$$o'v = 131 - 20.307 = 110.693$$
$$o'n = \sqrt{110.693^2 + 4.50^2} = 110.784$$

$113.80 - 110.784 = 3.016$ = depth of the spaces

Furthermore:

Ang. sin $nov$ = ang. sin $\frac{4.50}{20.80}$ = ang. sin $0.21634 = 12° 29' 38''$

Hence $$\frac{12.70 \times 12° 29' 38''}{360°} = 0.44 = \text{stroke } he$$

Then:

Ang sin $no'v$ = ang. sin $\frac{4.50}{110.784}$ = ang. sin $0.04061 = 2° 19' 39''$

It follows:

$$\frac{254 \times 2° 19' 39''}{360°} = 1.644 = \text{stroke } hi$$

But $$ei = hi - he = 1.644 - 0.44 = 1.204$$
$$ae = 1.16$$

hence $$ai = ae + ei = 1.16 + 1.204 = 2.364$$

$2.364 \times 2 = 4.728$ = width, seen at right angles to a generatrix, that the wheel spaces ought to have at the depth 3.016 in order to obtain the contact at the point $n$ lying at a distance of 4.50 from the plane of the axes.

At the point $n$ lying at a distance of 4.20 from the plane of the axes, is:

$$ov = \sqrt{20.80^2 - 4.20^2} = 20.371$$
$$o'v = 131 - 20.371 = 110.629$$
$$o'n = \sqrt{110.629^2 + 4.20^2} = 110.708$$

$113.80 - 110.708 = 3.092$ = depth of the spaces

Furthermore:

Ang. sin $nov$ = ang. sin $\frac{4.20}{20.80}$ = ang. sin $0.20192 = 11° 38' 56''$ hence $$\frac{12.70 \times 11° 38' 56''}{360°} = 0.41 = \text{stroke } he$$

Then:

Ang. sin $no'v$ = ang. sin $\frac{4.20}{110.708}$ = ang. sin $0.03793 = 2° 10' 24''$

It follows:

$$\frac{254 \times 2° 10' 24''}{360°} = 1.533 = \text{stroke } hi$$

But $$ei = hi - he = 1.533 - 0.41 = 1.123$$
$$ae = 1.16$$

hence $$ai = ae + ei = 1.16 + 1.123 = 2.283$$

$2.283 \times 2 = 4.566$ = width, seen at right angles to a generatrix, that the wheel spaces must have at the depth 3.092 in order to obtain the contact at the point $n$ lying at a distance of 4.20 from the plane of the axes.

At the point $n$, lying at a distance 3.90 from the plane of the axes, is:

$$ov = \sqrt{20.80^2 - 3.90^2} = 20.431$$
$$o'v = 131 - 20.431 = 110.569$$
$$o'n = \sqrt{110.569^2 + 3.90^2} = 110.637$$
$$113.80 - 110.637 = 3.163 = \text{depth of the spaces}$$

Furthermore:

$$\text{Ang. sin } nov = \text{ang. sin } \frac{3.90}{20.80} =$$
$$\text{ang. sin } 0.18750 = 10° \; 48' \; 25''$$

Then:

$$\frac{12.70 \times 10° \; 48' \; 25''}{360°} = 0.381 = \text{stroke } he$$

Then:

$$\text{Ang. sin } no'v = \text{ang. sin } \frac{3.90}{110.637} =$$
$$\text{ang. sin } 0.03525 = 2° \; 1' \; 12''$$

it follows:

$$\frac{254 \times 2° \; 1' \; 12''}{360°} = 1.425 = \text{stroke } hi$$

But $$ei = hi - he = 1.425 - 0.381 = 1.044$$
$$ae = 1.16$$

hence $$ai = ae + ei = 1.16 + 1.044 = 2.204$$

$2.204 \times 2 = 4.408 =$ width, seen at right angles to a generatrix that the wheel spaces ought to have at the depth 3.163 in order to obtain the contact at the point $n$ lying at a distance of 3.90 from the plane of the axes.

Now it must be borne in mind that the width of the wheel spaces at the outer circumference, seen at right angles to a generatrix, equals 10.39 (see Figures 2 and 6) and, by shaping the said wheel spaces so as to obtain the contact at the point $n$ lying at a distance of 4.80 from the plane of the axes, it results the Figure 7, in which the angle $abc$ is equal to:

$$\text{Ang. tan } \frac{\frac{1}{2} 10.39 - \frac{1}{2} 4.88}{2.935} =$$
$$\text{ang. tan } 0.93696 = 43° \; 8' \; 8''$$

In fact, in the said Figure 7, we find the data 2.935 and 4.88 determining same and which have been previously determined in correspondence of the point $n$ lying at a distance of 4.80 from the plane of the axes.

We make now the analysis of the points previously obtained with the aim of confirming that the contact takes place only at point $n$ situated on the external circumference of the pinion at a distance 4.80 from the plane of axes $OO'$.

Therefore the following table has been formulated by taking into account the data already determined and proceeding from the points $n$ lying at different distances from the plane of the axes (see Figure 5).

From a drawing at a larger scale of the section of the space between the wheel teeth, made by a plane passing along a generating line of the pitch cylinder and taking into account the different distances $$5.70 - 5.40 - 5.10 - 4.80 - 4.50 - 4.20 - 3.00$$

of the horizontal sections of said cross-section of the space between teeth, in relation to plane $OO'$ of the axes, it is proceeded in the following manner: First of all for each horizontal section, the chord $nv$ (for instance 5.70) of the considered section is indicated; after this, we must consider the width, in correspondence to the external circumference, of the space between two wheel teeth, as seen perpendicularly to a generating line of the pitch cylinder; after this, the product of the depth (2.657) of the space of the considered point, by the tangent of the angle (43° 8' 8'') hereinafter determined, is deduced and we multiply by 2 in order to take into account that said space is symmetrical and the width (5.403) resulting in correspondence to said section is obtained. By comparing this width (5.403) with the width (5.344), precedingly calculated in column 12 the spaces ought to have in said section, in order to perform the contact we may infer that in this section there is no contact. The same observation may be made and the same result will be obtained for all the preceding sections and for all the successive sections to that for which we have $nv = 4.80$ which is the only end in which there is the contact.

$nv = 5.70 - 10.39 - (2.657 \times 0.93696 \times 2) = 5.402 > 5.344$ by 0.059
$nv = 5.40 - 10.39 - (2.755 \times 0.93696 \times 2) = 5.219 > 5.192$ by 0.027
$nv = 5.10 - 10.39 - (2.848 \times 0.93696 \times 2) = 5.045 > 5.036$ by 0.009
$nv = 4.80 - 10.39 - (2.935 \times 0.93696 \times 2) =$ as Figure 7
$nv = 4.50 - 10.39 - (3.016 \times 0.93696 \times 2) = 4.731 > 4.728$ by 0.003
$nv = 4.20 - 10.39 - (3.092 \times 0.93696 \times 2) = 4.587 > 4.566$ by 0.020
$nv = 3.90 - 10.39 - (3.163 \times 0.93696 \times 2) = 4.455 > 4.403$ by 0.047
$10.39 - (4.50 \times 0.93696 \times 2) = 1.948$ By reading the above table proceeding from the bottom line upward, it is found that the last line is necessary only for determining the width of the bottom of the spaces.

In the second line from the bottom it is found that at the point $n$, lying at a distance of 3.90 from the plane of the axes, there is no contact, as otherwise the width of the wheel spaces, always seen at right angles to a generatrix, should have been equal to 4.408, just as it appears from the calculations already effected at that point, but this width is actually 4.455 and therefore there is a difference of 0.047.

In the third line it appears that at the point $n$, lying at a distance of 4.20 from the plane of the axes, there is no contact due to a difference of 0.020.

In the fourth line in which $nv = 4.50$ the difference is of 0.003 only.

In the fifth line it results that the point $n$ lying at a distance of 4.80 from the plane of the axes, there is a contact, as the width of the spaces in that point is that indicated in Figure 7.

And, at last, in the points $n$ related in the sixth, seventh and eighth lines there is no contact due to differences amounting to 0.009, 0.027 and 0.059, respectively.

Therefore I have demonstrated how the shaping of the wheel spaces in Figure 7 is determined when seen perpendicularly to a generatrix and from this, of course, it is easy to determine the shape of the teeth and I have also analytically demonstrated that by said shaping the contact is obtained only at the point $n$ lying at a distance of 4.80 from the plane of the axes.

But it is already known that there is a contact only at the point $r$. Therefore by joining the points $n$ and $r$ there results the line of contact $nr$. Said contact line may be assumed as a straight line, as if a large number of other contact points be taken along the same line, following the proceeding as set out above, and then these points be joined with one another, there results just a straight line, as shown in Figure 5, because the differences are so irrelevant that they are not appreciable, particularly for the purpose of the irreversibility as will be demonstrated hereinafter.

Of course I do not extend my work up to determine the other said points of contact, and this only in order not to complicate the specification further.

Briefly the pinion teeth, as well as the wheel spaces, Figure 7, are seen perpendicularly to a generatrix, while for the machining it is necessary to determine the same figures as seen at right angles to their helices, as regards the steps to be followed in order to obtain said views, it is sufficient to proceed as has been said in my copending application with regards to the reciprocal gears.

With the described gearing it is possible to obtain the irreversibility even with a transmission ratio of 1:1. In such a case, the diameter of the driven wheel is smaller than the diameter of the pinion and we have the following values:

Pitch circle diameter of pinion, 80 mm.
Pitch circle diameter of wheel, 25 mm.
Axial pitch of teeth, 25.4 mm.
Semi-angle between the two lateral sides of a cross section of a tooth, of pinion, 5° 50'
Semi-angle between the two lateral sides of a cross section of a tooth, of wheel, 18°
Total height of teeth, 7.70 mm.

By what has been shown, it becomes evident the importance and the effect of the inclination given to the flanks or lateral sides of the teeth in order to obtain the irreversibility between parallel axes. Moreover, this inclination permits, between certain limits, the gradual displacement of the contact zone from the plane of the axis.

In order to demonstrate how the irreversibility is obtained let us note what follows.

*Demonstration of the irreversibility*

By examination of the first table, it is found that at the right and left of the point $r$ there is no contact for such differences, that it is right to assume that the midline of the contact surface comes to lie just at 3.70 from the plane of the axes. Then, by examining the second table it is found that at the point $n$ lying at a distance of 4.50 from the plane of the axes there is no contact for a difference of so little as 0.003 while at the distance of 5.10 this difference amounts to 0.009; therefore it can be assumed that the midline of the contact surface comes to lie probably at the point $n$ lying at a distance of 4.70 from the plane of the axes.

Of course, a more exact mathematical determination could be obtained by effecting the operations on values which do not differ successively from one another by 0.03, as done, but by a smaller amount. If the said differences had been limited to 0.1, the data in Figure 7 depending on the value of $nv$ could have been determined directly from those derived from the value of $nv=4.70$.

In practice, however, the proceeding which has been adopted is amply sufficient.

Anyhow, referring to the contact point $r$, Figure 1, it is already known that $rz=3.70$ and $oz=17.261$. And referring to the contact point $n$, Figure 5, if $nv=4.70$ is, with great approximation $$ov = 20.238 + \frac{20.307 - 20.238}{2} = 20.261$$

(The data 20.307 and 20.238 correspond to the values of $ov$ referred to $nv=4.50$ and 4.80 respectively.)

Therefore in the same Figure 5 is:

$ov - oz = 20.261 - 17.261 = 3$
$nv - rz = 4.70 - 3.70 = 1$

By drawing by means of these data a right angle triangle it results that the line $nr$ is inclined by 18° 26' 4'' with respect to the plane of the axes. In fact (see Figure 8).

Ang. tan $abc$ = ang. tan 1:3 =
 ang. tan $0.33333 = 18°\ 26'\ 4''$

Of course, the length of line $nr$ is equal to the length of the hypothenuse $ab$, viz:

$$nr = ab = \sqrt{1^2 + 3^2} = 3.16$$

It is to be noted that, as line $nr$ is not disposed radially it lies between the teeth, on a plane whose inclination is different from the inclination of the profiles according to Figures 4 and 7. In fact, when a wheel space is seen perpendicularly to a generatrix and when considering that the width of the same space at the point $r$ is equal to 10.39, and as it has been assumed that $nv=4.70$, the width at the point $n$ is, with a great approximation, equal to:

$$4.88 - \frac{4.88 - 4.73}{3} = 4.83$$

(The heights 4.88 and 4.73 correspond to the widths of the space at that two points $n$ lying respectively at the distance of 4.80 and 4.50 from the plane of the axes. See 2nd table.)

Furthermore, by bearing in mind that the length of line $nr=3.16$ the Figure 9 may be drawn, in which is:

Ang. tan $abc$ = ang. tan $\dfrac{\frac{1}{2}10.39 - \frac{1}{2}4.83}{3.16} =$ ang. tan $0.87816 = 41°\ 17'\ 17''$ Therefore the contact surface between the teeth lies on a plane inclined by 41° 17' 17'' and consequently its length is equal to $$\frac{3.16}{\cos 41°\ 17'\ 17''} = 4.20$$

Let us now draw Figure 10, which is a diagrammatical view of a part of the wheel, in which the teeth are inclined according to the slant of the helices at the pitch circumference, viz:

Ang. tan $\dfrac{224 \times 3.1416}{254} =$ ang. tan $2.77051 = 70°\ 9'\ 10''$

Figure 11:
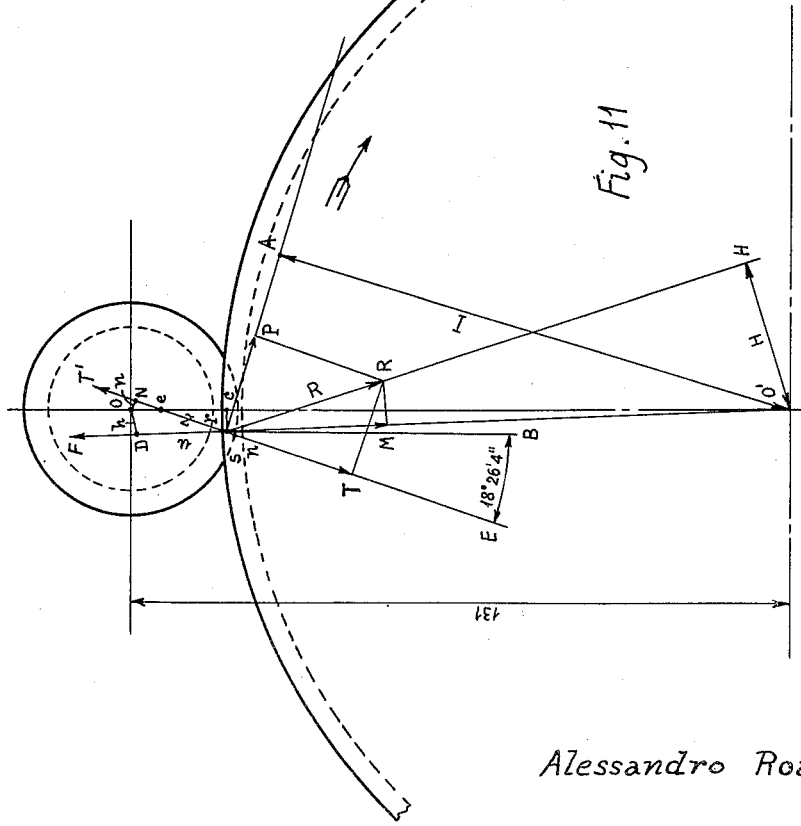
Fig. 11 is a reproduction, on a larger scale, of Figures 1 and 5 for a geometrical demonstration.

It is apparent that Figure 11 is a reproduction of Figures 1 and 5.

By cutting the gear on line $nsr$, Figure 11, and by seeing said section perpendicularly to a generatrix, the Figure 12 is obtained, which is a partial view in which the surfaces of contact between the teeth are inclined, as known, by 41° 17' 17''.

By indicating by P the peripheral stress impressed upon the wheel, see Figure 11, the surfaces into contact thrust each other, with a force $$Q = \frac{P}{\cos 70°\ 9'\ 10''} \text{ (see Figure 10)}$$

and by setting $P$=kg. 100, is:

$$Q = \frac{100}{0.33952} = \text{kg. } 294.13$$

Furthermore:

$F = P \tan 70°\ 9'\ 10'' = 100 \times 2.77051 = $ kg. 277.05

This means that the axial thrust, viz. the stress at right angles to the wheel faces, equals kgs. 277.05. This stress is represented in Figure 12 by the forces S'Q' and S'Q''. It is apparent that, due to the inclination of the surfaces of contact between the teeth, there are the two parallelograms S', N', F', Q' and S', N'', F'', Q''.

It is apparent that while the resultants S'Q' and S'Q'' balance one another, the components S'F' and S'F'' produce their effects and from these also the forces S'r' and S'r'' are respectively obtained. But line r'S'r'' is parallel to contact line nsr, Figure 11 and therefore in the same Figure 11 the force S'r' is represented by $sT$, while the force S'r'', which is equal and opposite to S'r' is represented by the force $sT'$.

Therefore, from the peripherical stress, from the measure or the angle at the apex of the wheel and from the inclination of the surfaces of contact between the teeth it results that the gear pair is simultaneously subjected (see Fig. 11):

(1) To a peripherical stress $sP$ tending to turn the wheel in clockwise direction;

(2) To the force $sT'$ tending to the same purpose; and (3) To the force $sT''$ tending to stop the rotation of the gear.

At the same time, from Figure 12 it results:

$S'F' = S'Q' \cos 41° 17' 17'' = 277.05 \times 0.75141 = 208.17$; and $S'r' = S'F' \cos(90° - 41° 17' 17'') = 208.17 \cos 48° 42' 43'' = 208.17 \times 0.65985 = $ kg. 137.36.

Of course, also $S'r'' = $ kg. 137.36.

Now, in Figure 11, from the forces $sP$ and $sT$ the resultant $sR$ is obtained.

But $sP = 100$, $sT = 137.36$; hence;

$$sR = \sqrt{100^2 \times 137.36^2} = \text{kg. } 169.90$$

The effect of this resultant, with respect to the wheel only, is equal to $$sR \times o'H$$

Now the lever arm will be determined in the following manner;

The point $s$ comes to be at half the distance between the points $n$ and $r$.

If from the same point $s$ the perpendicular $sc$ to line $co'$ is dropped, by bearing in mind that in Figure 5 is $nv = 4.70$, $rz = 3.70$ I can write:

$$sc = \frac{4.70 + 3.70}{2} = 4.20$$

But by bearing in mind that, in the same Figure 5 is $ov = 20.261$ and $oz = 17.261$, it follows (see Fig. 11):

$$oc = 17.261 + \frac{20.261 - 17.261}{2} = 18.761$$

hence $$o'c = 131 - 18.761 = 112.239$$

and $$o's = \sqrt{o'c^2 + sc^2} = \sqrt{112.239^2 + 4.20^2} = 112.317$$

And however:

Ang. tan $so'c = $ ang. tan $\frac{sc}{o'c} = $ ang. tan $\frac{4.20}{112.239} = $ ang. tan $0.03742 = 2° 8' 35''$ The angle B$so'$ is equal to angle $so'c$.

hence ang. $Eso' = $ ang. $EsB +$ ang. $Bso' = 18° 26' 4'' + 2° 8' 35'' = 20° 34' 39''$ Then Ang. tan $RsP = \frac{137.36}{100} = $ ang. tan $1.37360 = 53° 56' 40''$ As the angle $EsP = 90°$, is:

Ang. $o'sH = 90° - ($ang. $Eso' + $ ang. $Rsp) = 90° - (20° 34' 39'' + 53° 56' 40'') = 15° 28' 41''$ Ang. the required lever arm is:

$o'H = o's \sin 15° 28' 41'' = 112.317 \times 0.26689 = 29.97$

Therefore the effect of the resultant $sR$ multiplied by the said lever arm is equal to:

$sR \times o'H = 169.90 \times 29.97 = $ kgmm. 5091.90

Consequently the lever arm on which the peripheral stress $sP$ acts is:

$o'A = o's \cos$ ang. $so'P = 112.317 \times \cos 20° 34' 39'' = 112.317 \times 0.93620 = 105.15$ But $sP \times o'A = 100 \times 105.15 = $ kgmm. 10515   (1)

Hence it results that the force $sT$ reduces the effect of the peripheral stress from the product $SP \times o'A = 10515$ to the product $sR \times o'H = 5091.90$.

This means that the force $sT$ produces a braking effect that is equal to $10515 - 5091.90 = 5423.10$ kgmm.   (2)

At the same time the resultant $sR$, due to its direction, produces a thrust, passing through the wheel centre, this is equal to the intensity of the force $sM$. But, by analogy to what happens in all other wheels geared between parallel axes, to force $sM$ is opposed force $sF$, that is equal and in opposite direction, which tends to cause the pinion to turn in a direction that is opposite to the peripheral stress. On the contrary the force $sT'$, that is equal and in opposite direction to force $sT$ tends to cause the pinion to turn in the direction of the peripheral stress.

Therefore the resultant of said opposite forces, when summed to (2), will give the amount of the definitive braking.

Now:

$sP = sM = sR \cos$ ang. $o'sH = 169.90 \cos 15° 28' 41'' = 169.90 \times 0.963\ 74 = 163.73$;

$oD = co' \sin$ ang. $so'c = 131 \sin 2° 8' 35'' = 131 \times 0.03739 = 4.89$;

hence $sF \times oD = 163.73 \times 4.89 = 800.63$ kgmm.   (A)

Then:

As however the angle $sec$ is equal to the angle $EsB = 18° 26' 4''$, it results:

$$ec = \frac{sc}{\text{Tan } 18°26'4''} = \frac{4.20}{0.33333} = 12.60$$

and $oe = oc - ec = 18.761 - 12.60 = 6.161$;

hence:

$oN = oe \sin 18° 26' 4'' = 6.161 \times 0.31621 = 1.98$

But $$sT = 137.36$$

hence $sT' \times oN = 137.36 \times 1.98 = 271.97$ kgmm.   (B)

By subtracting the (B) from (A) it results:

$800.63 - 271.97 = 528.66$ kgmm.

Now is:

$$os = \sqrt{oc^2 + sc^2} = \sqrt{18.761^2 + 4.20^2} = 19.22;$$

furthermore:

$$528.66 : 19.22 = 27.50 \text{ kg.}$$

Hence the resultant of the forces $sF$ and $sT'$ is a stress of kgs. 27.50 acting perpendicularly to line $nsr$, in a direction that is opposite to the peripheral stress $sP$ and, is, of course, applied by a lever arm $o'A$.

But, when bearing in mind that $o'A = 105.15$, it results:

$$27.50 \times 105.15 = 2891.62 \tag{3}$$

By summing (2) with (3) it results:

$$5423.10 + 2891.62 = 8314.72 \tag{B}$$

This means that at the end the wheel is subjected simultaneously to the motive action (1) and to the braking action (4), whose ratio is:

$$\frac{8314.72}{10515} = 0.79$$

Therefore the driving action due to the peripheral stress is counteracted by a braking action amounting to 79% of the said motive or driving action.

Thus the irreversibility of gears with parallel axes has been demonstrated.

With particular reference to Figures 11 and 12 obtained by a cross section of the gear along a plane passing on the line of contact $nsr$ and observing this section normally to a generating line of the pitch cylinder of the driven wheel, it can be demonstrated, analytically, the importance of the tooth out line in order to obtain the irreversibility of the gearing. In fact, if we reduce ang. $\rho = 41°\ 17'\ 17''$ to a lower value, we reduce also the component $\overline{S'r'}$ which, as it results from what has been said heretofore, is equal $\overline{ST}$. Therefore, by reducing $\overline{S'r'}$, we reduce $\overline{ST}$ also, with the result that we cannot obtain the irreversibility.

This consideration allows, while maintaining unchanged all the characteristics of the wheel and pinion composing the couple, viz:

Inequality of the angles of inclination of the respective helical worms;

Reduced diameters of the wheels in relation to the transmission ration based on the modular system;

Height of teeth;

Any other element we want to examine; to draw the conclusion that a reversible couple becomes irreversible and vice versa by varying the inclination of the tooth outline. The inclination of the flanks of the teeth, in order to obtain the irreversibility of the couple, are comprised, as it results from tests, in a field varying from 39° to 52° for the sections of the pinion teeth and from 36° to 51° for the sections of the driven wheel teeth.

An analytical demonstration of what has been affirmed may be the following one:

Indicating by:

$P$ = the peripheric strain;
$\rho$ = the semiangle between the two lateral flanks of a cross section of tooth;
$\beta$ = angle of inclination of the thread on the pitch diameter of the wheel; from Figure 10, we get:

$$F = P \cot g\ \beta$$

while from Fig. 12 we have $$\overline{S'F'} = F \cos \rho$$

where from $$S'r' = F \cos \rho \sin \rho = \overline{ST}$$

from which, by putting the resultant $\overline{SR} = R$ (Fig. 11)

$$R = \sqrt{P^2 \cos^2 \rho \sin^2 \rho} = \sqrt{P^2 + P^2 \cot g^2 \beta \cos^2 \rho \sin^2 \rho}$$

$$R = P\sqrt{1 + \cot g^2 \beta \cos^2 \rho \sin^2 \rho}$$

and putting $\overline{OH} = H$ we have $$\text{resultant moment} = RH \tag{X}$$

Said resultant $R$ generates a component passing by the centre of the wheel, of $\overline{SM}$ intensity, balanced by $\overline{SF}$ which will be indicated by $U$.

Indicating by $\overline{ST} = Z$, we have that the moments of forces $U$ and $Z$ acting on pinion, are resulting respectively $$Uh$$
$$Zn$$

The resultant effect $G$ of these moments on the medium point of contact S, is given by $$\frac{Uh - Zn}{OS} = G$$

a force which we may suppose acting along the prolongation of the peripherical strain P, the moment of which in relation to the wheel centre is $$\text{moment of the force } G = GI \tag{Y}$$

The total resistant effect, in the direct motion, at the wheel centre, is obtained by adding the resultant moments of the Expressions X and Y viz.

$$RH + GI \tag{Z}$$

while the motion moment due to the peripherical strain is $$\text{motion moment of } P = PI \tag{W}$$

However, owing to the displacement of the contact zone and of the angle of inclination $\rho$ of the flank of tooth, the effect is that indicated by (Z).

From what has been said therefore, it results that the wheel, in the direct motion, is submitted to the motion action expressed by Formula W and to the resistant action expressed by Formula Z.

When the pinion is the motivating element, it must result $PI \geqslant RH + GI$.

When the pinion is no longer the motor, but becomes resistant, viz. when the force acting on it changes sign, viz. it becomes $-P$, while the wheel, which was driven before, becomes the motor, and at the same time satisfying the irreversibility of the couple, we must get $$RH - GI \geqslant +PI$$

Having in mind the preceding mathematical expressions, we see that it must be $$-PI \leqslant P\sqrt{1 + \cot g^2 \beta \cos^2 \rho \sin^2 \rho} H + GI$$

by which are confirmed the previous affirmations relating to the conditions to be satisfied for obtaining the irreversibility of the gearing.

Besides, it must be reminded that an irreversible couple may become reversible also on account of a more accurate finish of the cooperating surfaces of the wheel and pinion teeth; in this case, in order to obtain the irreversibility, it is necessary to increase the distance of the contact zone $nsr$ from the plane of the axes, when the finish of said surfaces will be more accurate, while this distance can be reduced when said surfaces are not accurately finished or are rough.

Although, for descriptive reasons, the present invention has been based on what has been previously described and reported by way of example, many additions and modifications could be brought in the embodiment of the invention, all of them being based, though, on its fundamental conceptions resumed in the following claims.

Having now particularly described and ascertained the nature of my said invention and in what manner the same is to be performed, I declare that what I claim is:

1. An irreversible gear pair of which a first one of the pair is a driving gear and the second one of the pair is a driven gear, said gears having intermeshing helical teeth of which sections of the teeth in a plane common to both gears perpendicular to the axes thereof are trapezoidal with side faces of the trapezoids at the intermeshing of the gears making line contact between a tooth of one gear and a tooth of the other gear, and said side face of the trapezoid of one gear making a different angle with a reference diameter of that gear from the angle made by the side face of the trapezoid of the other gear with a similarly located reference diameter of said other gear.

2. An irreversible gear pair in accordance with claim 1, wherein said gears are of different sizes diametrically and the said angle of the smaller one of the pair is greater than the said angle of the larger one of the pair.

3. An irreversible gear pair in accordance with claim 1, wherein said gears are of different sizes diametrically and the said angle of the smaller one of the pair is comprised between 39° and 52° and for the larger gear is comprised between 36° and 51°.

4. An irreversible gear pair in accordance with claim 1 wherein said gears are of different sizes diametrically and in any selected pair of gears the said angles of the trapezoids are proportionate to said angles of any other selected pair of gears.

5. An irreversible gear pair in accordance with claim 1 wherein said gears are of different sizes diametrically and in any selected pair wherein the smaller the smaller gear is made, the greater its said angle of trapezoidal side face is made.

6. An irreversible gear pair in accordance with claim 1 wherein said gears are of different sizes diametrically and wherein the smaller the smaller gear is, the greater the said angle of the smaller gear, and wherein the said angle of the larger gear varies substantially in proportion to the variation of said angle of the selected smaller gear.

7. An irreversible gear pair in accordance with claim 1 wherein said gears are of different sizes diametrically and wherein the smaller the smaller gear is, the greater the said angle of said smaller gear, and wherein the said angle of the larger gear varies substantially in proportion to the variation of said angle of the selected smaller gear, and wherein the said angle of the larger gear is always a little smaller than the said angle of the corresponding smaller gear.

8. An irreversible gear pair of which a first one of the pair is a driving gear and the second one of the pair is a driven gear, said gears having intermeshing helical teeth, a tooth of the driving gear having a driving side surface, and a tooth of the driven gear having a driven side surface addressed toward the said driving surface, said surfaces having areas thereof in contact with each other in meshing engagement of the said teeth, and the addressed surfaces of the driven side of the driven tooth and driving side of the driving tooth making different angles with respective diameters of said gears.

ALESSANDRO ROANO.

REFERENCES CITED

The following references are of record in the file of this patent:

UNITED STATES PATENTS

| Number | Name | Date |
| --- | --- | --- |
| 1,144,184 | Faust | June 22, 1915 |
| 1,295,231 | Stewart et al. | Feb. 25, 1919 |
| 1,647,157 | Trbojevich | Nov. 1, 1927 |
| 1,772,688 | Roano | Aug. 12, 1930 |